United States Patent
Hudetz

(10) Patent No.: US 12,555,730 B2
(45) Date of Patent: Feb. 17, 2026

(54) RELAY MODULE WITH COMBINED CONTROL AND POWER SUPPLY INPUT

(71) Applicant: Phoenix Contact GmbH & Co. KG, Blomberg (DE)

(72) Inventor: Hans-Peter Hudetz, Hameln (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 0 days.

(21) Appl. No.: 17/640,144

(22) PCT Filed: Sep. 1, 2020

(86) PCT No.: PCT/EP2020/074336
§ 371 (c)(1),
(2) Date: Mar. 3, 2022

(87) PCT Pub. No.: WO2021/043761
PCT Pub. Date: Mar. 11, 2021

(65) Prior Publication Data
US 2022/0336175 A1 Oct. 20, 2022

(30) Foreign Application Priority Data
Sep. 3, 2019 (LU) ........................................ 101387

(51) Int. Cl.
*H01H 47/22* (2006.01)
*H01H 47/32* (2006.01)
(Continued)

(52) U.S. Cl.
CPC ........ *H01H 47/223* (2013.01); *H01H 47/325* (2013.01); *H01H 50/08* (2013.01); *H02H 3/24* (2013.01)

(58) Field of Classification Search
CPC .... H01H 47/223; H01H 47/325; H01H 50/08; H02H 3/24
See application file for complete search history.

(56) References Cited

U.S. PATENT DOCUMENTS 4,788,621 A * 11/1988 Russell ............. H01H 71/0228
361/115
4,999,730 A * 3/1991 Pickard .................. H02H 3/207
340/662

(Continued)

FOREIGN PATENT DOCUMENTS

CN 205212811 U * 5/2016
CN 109167334 A * 1/2019
(Continued)

OTHER PUBLICATIONS

Machine translation of CN 205212811 by Clarivate Analytics, Oct. 2025, 7 pages.*

(Continued)

*Primary Examiner* — Harry R Behm
(74) *Attorney, Agent, or Firm* — Weber Rosselli & Cannon LLP

(57) ABSTRACT

The present disclosure relates to a relay module including a control input for combined control and power supply of the relay module with alternating voltage. A fixed voltage controller of the relay module generates a fixed voltage after rectification of the alternating voltage or a portion of the alternating voltage. A comparator is operated by the fixed voltage and derives a reference voltage from the fixed voltage. The comparator compares a rectified and smoothed portion of the alternating voltage with the reference voltage. A switching step of the relay module operates a relay unit according to the comparison of the comparator, which relay unit is connected on the input side to the switching step and on the output side to switch connections of the relay module.

21 Claims, 4 Drawing Sheets

(51) Int. Cl.
*H01H 50/08* (2006.01)
*H02H 3/24* (2006.01)

(56) References Cited

U.S. PATENT DOCUMENTS

| | | | | |
|---|---|---|---|---|
| 5,811,963 | A | 9/1998 | Elwell | |
| 6,906,604 | B1* | 6/2005 | Mader | H01H 50/642 335/128 |
| 2005/0117732 | A1* | 6/2005 | Arpin | H04M 3/005 379/27.01 |
| 2008/0261426 | A1* | 10/2008 | Diekmann | H01H 85/2045 439/189 |
| 2010/0240237 | A1* | 9/2010 | Beyer | H01R 9/2466 439/135 |
| 2011/0063759 | A1* | 3/2011 | Billingsley | H01H 9/541 361/1 |
| 2012/0126634 | A1* | 5/2012 | Wu | H02J 9/005 307/117 |
| 2013/0121048 | A1* | 5/2013 | Gasperi | H02M 3/156 363/89 |
| 2014/0133061 | A1* | 5/2014 | Noesner | H01H 47/18 361/195 |
| 2016/0352127 | A1* | 12/2016 | Prakash | H02J 9/062 |

FOREIGN PATENT DOCUMENTS

| | | |
|---|---|---|
| DE | 3840991 A1 * | 12/1998 |
| DE | 102007006830 A1 | 8/2008 |
| EP | 3185272 A1 | 6/2017 |
| WO | 2015017882 A1 | 2/2015 |

OTHER PUBLICATIONS

Chinese Office Action issued in Chinese Patent Application No. 202080061769.8 dated May 24, 2023 with English translation (through google translate).

* cited by examiner

RELAY MODULE WITH COMBINED CONTROL AND POWER SUPPLY INPUT

CROSS-REFERENCE TO RELATED APPLICATION

This application is a U.S. National Stage Entry filed under 35 U.S.C. § 371 of International Application No. PCT/EP2020/074336, filed on Sep. 1, 2020, which claims the benefit of, and priority to, Luxembourg Patent Application No. LU 101387, filed on Sep. 3, 2019, the entire content of each of which is incorporated by reference herein.

BACKGROUND

Technical Field

The present disclosure relates to a relay module. More particularly, the present disclosure relates to, without being not limited to, an AC powered relay module having an adjustable switching threshold with low hysteresis.

Background of Related Art

Relay modules already on the market comprise a low-pass filter on the input side, for example an RC element. Since such relay modules are fed directly from the alternating voltage (AC) of the drive signal, the low-pass filter is used specifically against interference signals from the AC network on the drive side. However, such relay modules have a relatively wide range of response and dropout voltage due to the physical characteristics of the relay coil, for example, the ferromagnetic state of the core of the relay coil. In this case, the advantage of lower current consumption of the relay modules compared to conventional contactors also has a negative effect. For example, the response and dropout voltage range at 230 V AC nominal drive voltage may be between 170 V response voltage and 40 V AC dropout voltage, depending on the relay coil. Herein, voltage and current specifications for AC may refer to the respective effective value or root mean square (RMS).

When switching other motors and contactors, high interference voltages and interference currents are often generated. These may couple into the control lines of the relay module due to long cable lengths, even with separate AC networks.

Interference voltages and interference currents in the control line may lead to unintentional switching (e.g. response) or delayed release (e.g. dropout) of the relay coil. Furthermore, a status indicator may light up, in particular a light-emitting diode (LED) responding at low current, although the relay coil has not yet caused a switching operation. This display and switching behavior is misleading and therefore undesirable.

In order to limit these unwanted characteristics of conventional relay modules, a filter, for example an RC element, is often connected in parallel to the input. This filter is intended to compensate for interference and to ensure that the relay module is switched on or off safely. In some systems, especially in power plant technology, this type of filter is not sufficient, so that faulty behavior of relay modules still occurs here.

SUMMARY

It is an object of the present disclosure to provide a remedy here. In particular, the present disclosure may be based on the object of providing a relay module with an adjustable and/or low-hysteresis switching threshold.

The object is met according to the present disclosure with the features of the independent claim. Expedient implementations and advantageous further embodiments of the present disclosure are indicated in the dependent claims.

Further features and advantages of embodiments of the present disclosure are described below, in part with reference to the drawings.

According to one aspect of the present disclosure, a relay module includes a control input to which AC voltage is applied or applicable for combined control and power supply of the relay module. The relay module may include a fixed voltage regulator configured to generate a fixed voltage after rectification of the AC voltage or a portion of the AC voltage. The relay module may include a comparator configured to be driven by the fixed voltage and to compare a reference voltage derived from the fixed voltage to a rectified and smoothed portion of the AC voltage. The relay module may include a switching stage configured to operate a relay unit in response to the comparison of the comparator. The relay module may include a relay unit connected on the input side to the switching stage and on the output side to switching connections of the relay module.

Embodiments of the relay module can unambiguously (or definitely) control whether the switching stage operates the relay unit or not based on the comparison in the comparator. Since the reference voltage for the comparison is derived from the fixed voltage, a switching threshold at the control input may be state-independent and/or exhibit low hysteresis. Since the comparator is operated from the fixed voltage, the same or further embodiments of the relay module may be operated without a separate or permanent power supply.

The AC voltage may be a mains voltage. The AC voltage may be 110 V AC to 230 V AC. Alternatively or in combination, the fixed voltage may be 5 V DC to 12 V DC.

The derived reference voltage may be a fixed component (or portion) of the fixed voltage. The relay module, in particular the comparator, may comprise a voltage divider configured to derive the reference voltage as a fixed component from the fixed voltage.

The relay module may further comprise a rectifier connected upstream of the fixed voltage regulator. The rectifier may comprise a bridge rectifier for rectifying the AC voltage or a portion of the AC voltage.

The switching stage may switch a coil circuit of the relay unit fed by the rectifier. The switching stage may be configured to selectively conductively connect the negative terminal of the rectifier to the relay unit and disconnect it from the relay unit, depending on the comparison. A status indicator may be connected in the coil circuit, and in embodiments, may be in series with the relay unit.

A reactance, which in embodiments may be a capacitive reactance, may be arranged between the control input and the rectifier (connected upstream of the fixed voltage regulator), which generates the portion of the AC voltage for rectification. A majority of the AC voltage, which in embodiments may be more than half or more than 75%, may drop out at the reactance.

The comparator may include an operational amplifier to perform the comparison. The rectified and smoothed portion of the AC voltage and the reference voltage may be applied to inputs of the operational amplifier. A control voltage controlling the switching stage may be generated by the operational amplifier.

The comparator may generate the rectified and smoothed portion of the AC voltage for comparison with the reference voltage independently of the rectifier upstream of the fixed voltage regulator. For example, the comparator may comprise a half-wave rectifier with a smoothing capacitor. The half-wave rectifier may have the AC voltage, or a portion of the AC voltage, present as an input voltage. The half-wave rectifier may generate a smoothed DC voltage for the rectified and smoothed portion of the AC voltage in the comparator.

The comparator may include a voltage divider. The voltage divider of the comparator may have the smoothed DC voltage of the half-wave rectifier applied thereto. The voltage divider of the comparator may generate a portion of the smoothed DC voltage as the rectified and smoothed portion of the AC voltage in the comparator.

The voltage divider may be controllable, for example by means of a potentiometer. This may allow the rectified and smoothed portion of the AC voltage to be controllable for comparison. In particular, this may allow the switching threshold at the control input to be controllable. For example, the switching threshold may be manually adjustable at the relay module.

The input voltage of the comparator may be tapped between the control input and the rectifier (connected upstream of the fixed voltage regulator). The comparator may tap the input voltage before the reactance (for example via mega-ohm resistors in the comparator) or after the reactance (for example with correspondingly smaller series resistors in the comparator).

The relay module may be arranged in a closed housing. The housing may be closed due to low power dissipation of the relay module, for example, because circuit elements of the relay module are energized only during operation of the relay unit and/or the reactance decreases the voltage level of the AC voltage almost without loss.

Externally accessible terminals for the switching connections may be arranged on the housing. The housing may be mounted on a mounting rail, which in embodiments may be a top-hat rail. The control input may also be wired to the housing via externally accessible terminals. Alternatively or additionally, the control input and/or the switching terminals may have plug-in contacts on the housing, which are arranged to make contact with conductor rails extending parallel to the mounting rail.

The housing may have an externally accessible slot for interchangeable mechanical and electrical connection of the relay unit. This may allow the relay module to be adapted to different switching capacities, switching voltages, switching currents, and/or relay functions by inserting or replacing the relay unit. For example, a relay unit may be used for a current impulse relay and/or for more than two states.

BRIEF DESCRIPTION OF THE DRAWINGS

In the following, various aspects and features of the present disclosure are explained in more detail with reference to the drawings, in which.

DETAILED DESCRIPTION

Figure 1:
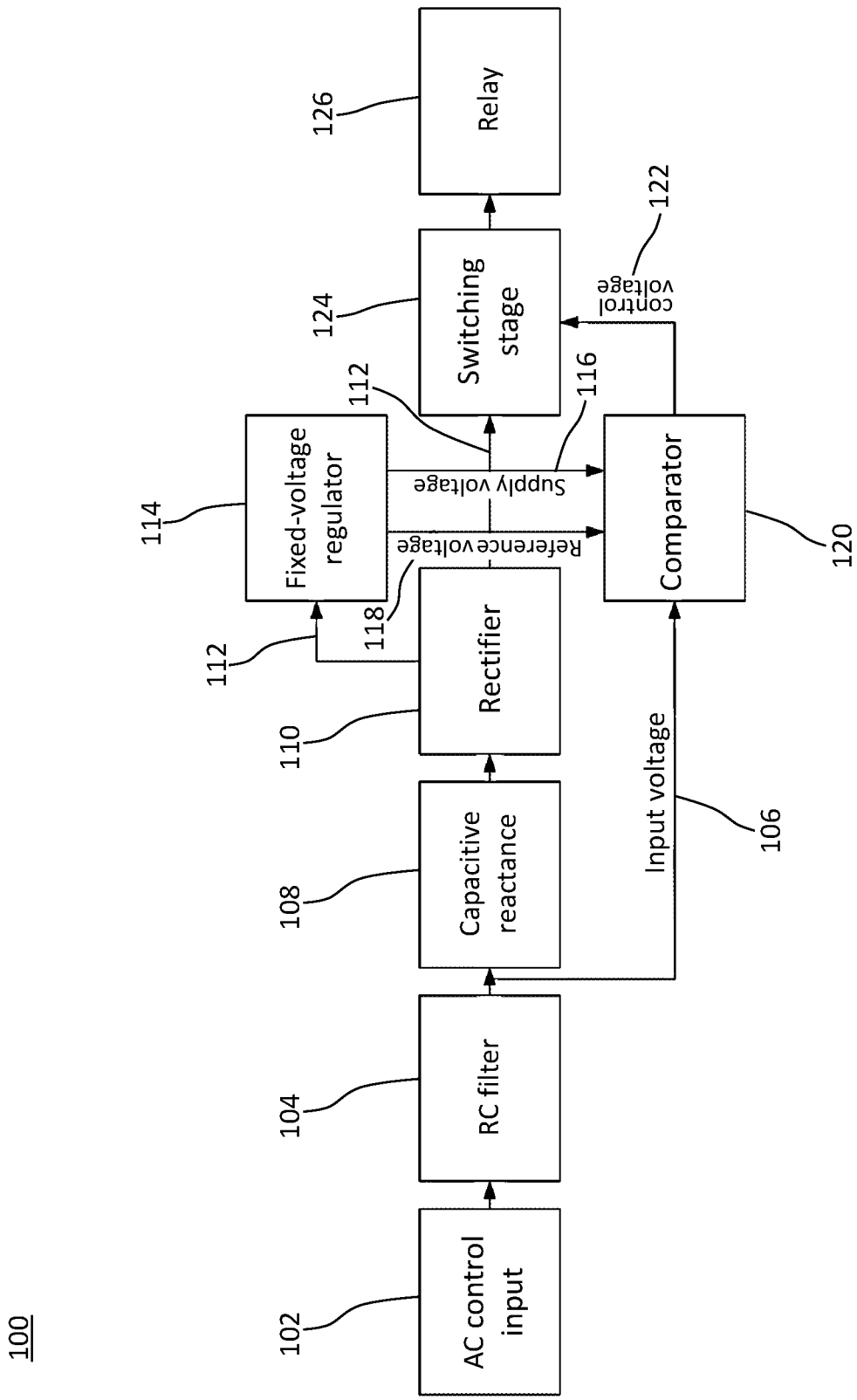
FIG. 1 is a schematic representation of a block diagram of a relay module according to a first embodiment of the present disclosure.

FIG. 1 shows a schematic diagram of a block diagram of a first embodiment of a relay module generally designated by reference numeral 100.

The relay module 100 includes a control input 102 to which alternating current (AC) voltage is or can be applied for combined control and power supply of the relay module 100. A fixed voltage regulator 114 of the relay module 100 generates a fixed voltage 116 after rectifying the AC voltage or a portion of the AC voltage. A comparator 120 of the relay module 100 is operated by the fixed voltage 116 as a supply voltage. The comparator 120 compares a reference voltage 118 derived from the fixed voltage 116 to a rectified and smoothed portion of the AC voltage applied to the control input 102. A switching stage 124 of the relay module 100 operates a relay unit 126 of the relay module 100 depending on the comparison of the comparator 120. The relay unit 126 is connected on the input side to the switching stage 124 and on the output side to switching terminals of the relay module 100.

The first embodiment of the relay module 100 may include the AC control input 102, the fixed voltage regulator 114, the comparator 120, the switching stage 124, and the relay unit 126. The relay unit 126 may also be referred to as the relay for short.

The relay unit 126 may include a mechanical relay. For this purpose, the switching stage 124 operates an electromagnet of the relay unit 126 in accordance with the comparator 120. The current switched by the switching stage 124 flows in an excitation coil of the electromagnet of the relay unit 126 and generates a magnetic flux through a ferromagnetic core of the electromagnet. In one embodiment of the first embodiment, a movably mounted armature (for example, also ferromagnetic) opens and/or closes the switching terminals of the relay module 100 in a switching position. Without the current in the excitation coil, the armature returns from the switching position to an initial position by a spring force.

While voltage thresholds and/or current thresholds of the current in the excitation coil may be significantly different for switching and dropping the armature, for example due to the ferromagnetic core, the switching stage 124 is configured to drive the relay unit 126 to either switch or drop the armature in accordance with the comparator 120. As a result, hysteresis or deviation between the switching voltage and the dropout voltage at the AC control input 102 may be reduced or at least substantially avoided.

It is contemplated that the first embodiment of the relay module 100 may include a rectifier 110 between the AC control input 102 and the fixed voltage regulator 114 for rectifying the AC voltage or a portion of the AC voltage applied to the AC control input 102. The DC voltage 112 of the rectifier 110 (for example, a portion of the AC voltage rectified by the rectifier 110) feeds the fixed voltage regulator 114. In embodiments, the switching stage 124 switches the DC voltage 112 generated by the rectifier 110 to operate the relay unit 126 in accordance with the comparator 120. For this purpose, a control voltage 122 output from the comparator 120 to the switching stage 124 corresponds to the result of the comparison of the comparator 120.

It is envisioned that the first embodiment of the relay module 100 may include a capacitive reactance 108 between the AC control input 102 and the rectifier 110. The capacitive reactance 108 is configured to match the voltage level of the AC voltage to the voltage level of the rectifier 110 or the fixed voltage regulator 114. For this purpose, a major part of the voltage level of the AC voltage drops at the capacitive reactance 108. Due to a dominant reactive power, the voltage drop across the capacitive reactance 108 is essentially without heat dissipation.

The low or substantially absent heat loss improves the energy efficiency of the relay module 100 and/or enables a compact design, for example in a narrow housing and/or a housing without ventilation openings. As can be appreciated, a narrow width of the housing of the relay module 100 in a housing for mounting on a mounting rail, for example, a top-hat rail allows more modules to be mounted on the same mounting rail.

An input voltage 106 corresponding to or derived from the AC voltage applied to the AC control input 102 is applied to the comparator 120. From the input voltage 106, the comparator generates the rectified and smoothed portion of the AC voltage applied to the AC control input 102 for comparison with the reference voltage 118.

Since the reference voltage 118 is subject to the fixed voltage regulator 114 (i.e., derived from the fixed voltage 116) and the input voltage 106 is not subject to the fixed voltage regulator 114 (for example, is linear from the AC voltage applied to the AC control input 102), the comparison of the comparator 120 may acquire absolute changes in the AC voltage applied to the AC control input 102.

The input voltage 106 may be tapped directly at the AC control input 102 or between the AC control input 102 and the capacitive reactance 108.

In embodiments, the first embodiment of the relay module 100 may include an RC filter 104 between the AC control input 102 and the capacitive reactance 108. The RC filter may filter out voltage fluctuations, for example, that are shorter in time than an application-dependent switching rhythm of the relay module 100, preferably even if the voltage fluctuations exceed or fall below the uniform switching threshold of the relay module.

The input voltage 106 is preferably tapped after the RC filter 104 and before the rectifier 110, for example before the capacitive reactance 108.

Figure 2:
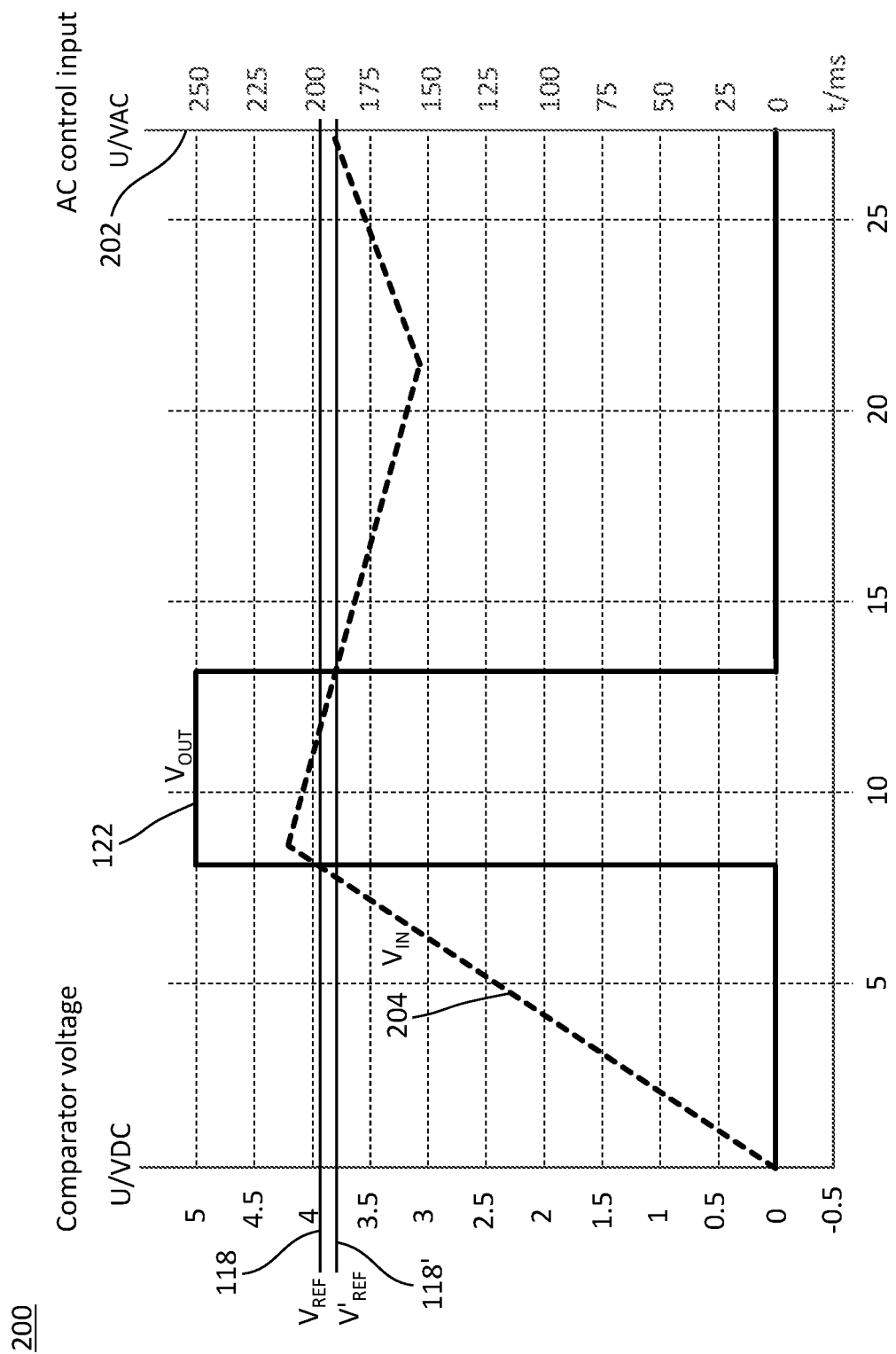
FIG. 2 is a diagram of a switching behavior of a relay module according to a second embodiment of the present disclosure.

With reference to FIG. 2, a diagram of a switching behavior of the relay module 100 according to a second embodiment of the present disclosure is illustrated. The second embodiment may be implemented with some or all of the features of the independent claim and/or the first embodiment. Features that are the same as or interchangeable with those of the first embodiment are described with the same reference numerals in the second embodiment.

Diagram 200 shows an example of how small a hysteresis may be due to the second embodiment of the relay module 100, for example, due to the fixed voltage regulator 114 in connection with the comparator 120 for controlling the switching stage 124 (also referred to as the comparator circuitry). Here, the hysteresis refers to the difference between the switching voltage and the dropout voltage (i.e., the voltage threshold for switching or dropping out the relay unit 126) at the AC control input 102. The hysteresis is small in the sense that the difference is small compared to the switching voltage, for example, less than 10% or less than 1%.

Diagram 200 shows a time history (with the time scale on the horizontal axis). Voltages are plotted vertically. AC voltage at AC control input 102 is plotted on the right vertical axis. DC input and output voltages for comparison in comparator 120 are plotted on the left vertical axis and labeled $V_{IN}$ and $V_{OUT}$ in diagram 200.

The DC input voltage $V_{IN}$ is an example of the rectified and smoothed portion 204 of the AC voltage 202 when compared to the reference voltage 118 in the comparator 120. For example, the DC input voltage 204 is linearly dependent on the AC voltage 202 applied to the AC control input 102, such that the left scale in the diagram 200 for the DC input voltage 204 for comparison in the comparator 120 corresponds to a corresponding value of the AC voltage 202 at the AC control input 102 on the right scale in the diagram 200.

The comparator 120 compares the DC input voltage 204 to the reference voltage 118, resulting in the DC output voltage ($V_{OUT}$), which is an example of the control voltage 122. The control voltage 122 is a logic level that uniquely determines the switching (i.e., a state of operation) of the relay unit 126 and de-energizing or dropout (i.e., a currentless or de-energized state) of the relay unit 126.

The difference between the reference voltage 118 to switch (i.e., the reference voltage starting from the currentless state) and the reference voltage 118' to drop (i.e., the reference voltage starting from the operating state) is small compared to the reference voltage 118. For example, the difference is 0.2 V at 3.9 V reference voltage 118, or 5%, of the reference voltage 118. Because of the linear relationship between the AC voltage 202 and the rectified and smoothed portion 204 of the AC voltage 202, the hysteresis at the AC control input 102 is also only 5%.

Figure 3:
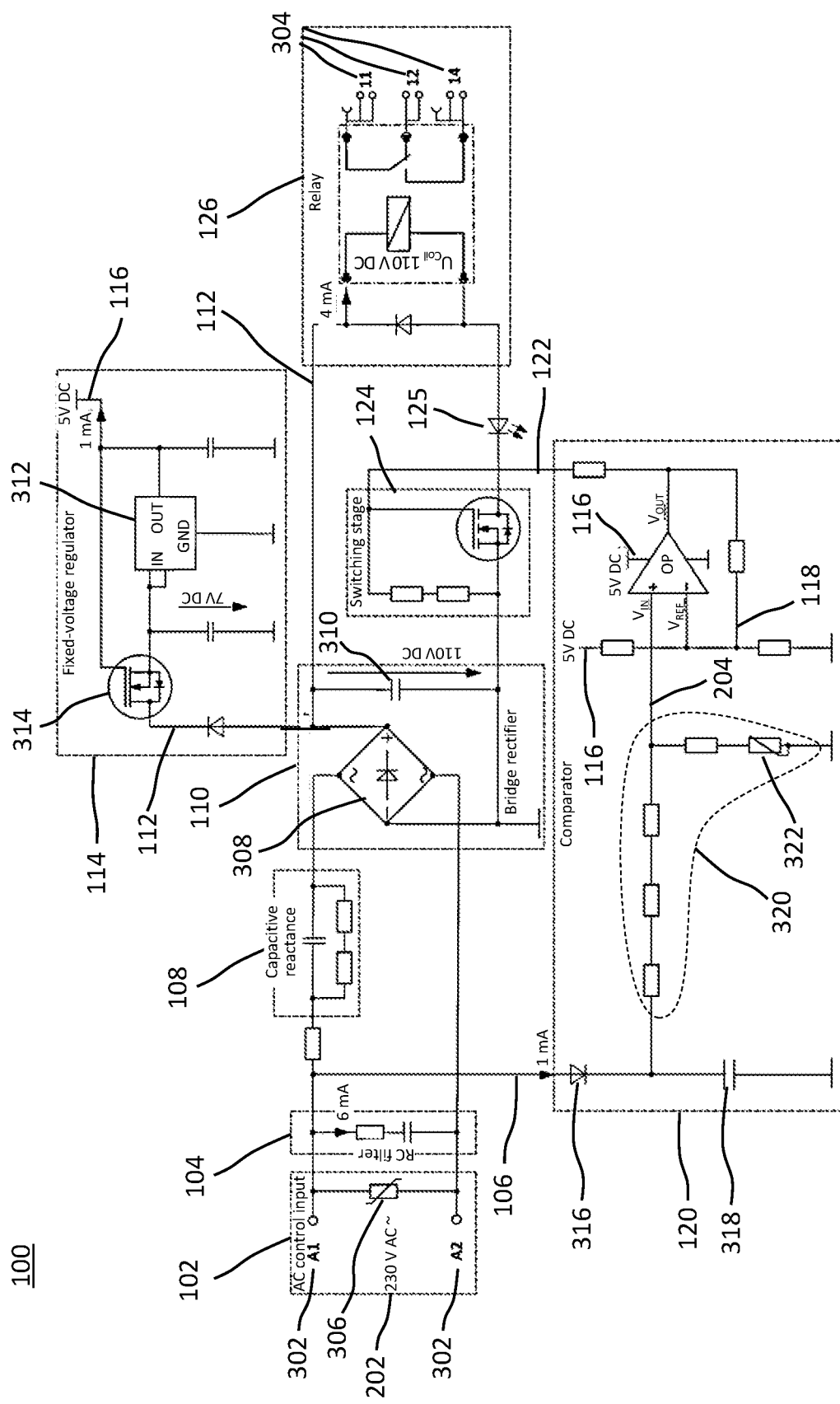
FIG. 3 is a schematic circuit diagram of a relay module according to a third embodiment of the present disclosure.

FIG. 3 shows a schematic circuit diagram of the relay module 100 according to a third embodiment of the present disclosure. The third embodiment may be implemented with some or all of the features of the independent claim, the first embodiment and/or the second embodiment. Features that are the same as or interchangeable with those of the first or second embodiment are described in the third embodiment with the same reference numerals.

For selective control of the relay module 100, an AC voltage 202 (for example, 230 V AC) is applied to an AC control input 102 as the control voltage 202 at the terminals 302 of the control input (with contacts A1 and A2). A varistor 306 connected in parallel with the terminals 302 in the AC control input 102 serves as overvoltage protection. A capacitive reactance 108 is used for voltage reduction.

The reduced AC voltage, i.e., the portion of the AC voltage 202 present after the capacitive reactance 108, is rectified by a rectifier 110. The rectifier 110 includes a bridge rectifier 308 with a smoothing capacitor 310.

A fixed voltage regulator 114 includes a voltage regulator 312 (for example, a low-drop voltage regulator) preceded by a normal-conducting (i.e., self-conducting) field-effect transistor 314 (for example, a depletion-mode MOSFET). The voltage regulator 312 generates a fixed voltage 116 that serves as a supply voltage and also proportionally as a reference voltage 118 for a comparator 120. The comparator 120 may also be referred to as a regulating stage.

The high input voltage range (for example, of 110 V DC) is achieved via the self-conducting MOSFET 314 in connection with the low-drop voltage regulator 312. Since the required current (for example, 1 mA) for the comparator 120 and the control of the switching stage 124 is very low, only very low power losses occur there.

The comparator 120 compares the reference voltage 118 to a rectified and smoothed portion 204 of the AC voltage (i.e., the DC input voltage) determined from the input voltage 106 (for example, before or after an RC filter 104). The input voltage 106 is rectified using a half-wave rectifier 316 and smoothed using another smoothing capacitor 318. The rectified and smoothed portion 204 of the AC voltage 202 is adjustable by a voltage divider 320. Since the rectified and smoothed portion 204 is the DC input voltage for comparison with the reference voltage 118, the adjustable voltage divider 320 can be used to adjust the (substantially uniform) threshold (also: switching threshold) of the AC voltage 202 for switching (or actuating) and de-energizing (or dropout of) the relay unit 126.

When the reference voltage 118 is exceeded, the comparator 120 switches the switching stage 124 and thus operates the relay unit 126. The switching threshold may be determined (for example, depending on the specification) by a change in the voltage divider 320 (e.g., by adjusting a potentiometer 322).

This ensures that the relay has a fixed (i.e., substantially uniform) on and off threshold. Furthermore, a status indicator 125 (e.g., a light-emitting diode, LED) lights up only when the relay unit 126 is switched.

Unwanted switching of the relay, delayed de-energization (or dropout) of the relay and/or incorrect display of the state are thus prevented. Furthermore, an additional (in particular separate, uninterrupted supply voltage) for the relay module 100 is not required.

The voltages and currents drawn in the circuit diagram of FIG. 3 are exemplary. For example, a 230V AC voltage 202 may have a corresponding input voltage 106 at the AC control input 102. The current distribution may be as follows. Approximately 6 mA flows in the RC element 104 (or RC filter). Approximately 4 mA flows in the excitation coil (i.e., the relay coil) in the switched state. The other circuit components require approximately 2 mA. Thus, the current consumption is low.

Due to the reactance 108 and the low current consumption of the other circuit parts (especially the comparator 120), the power dissipation is thus very low.

Figure 4:
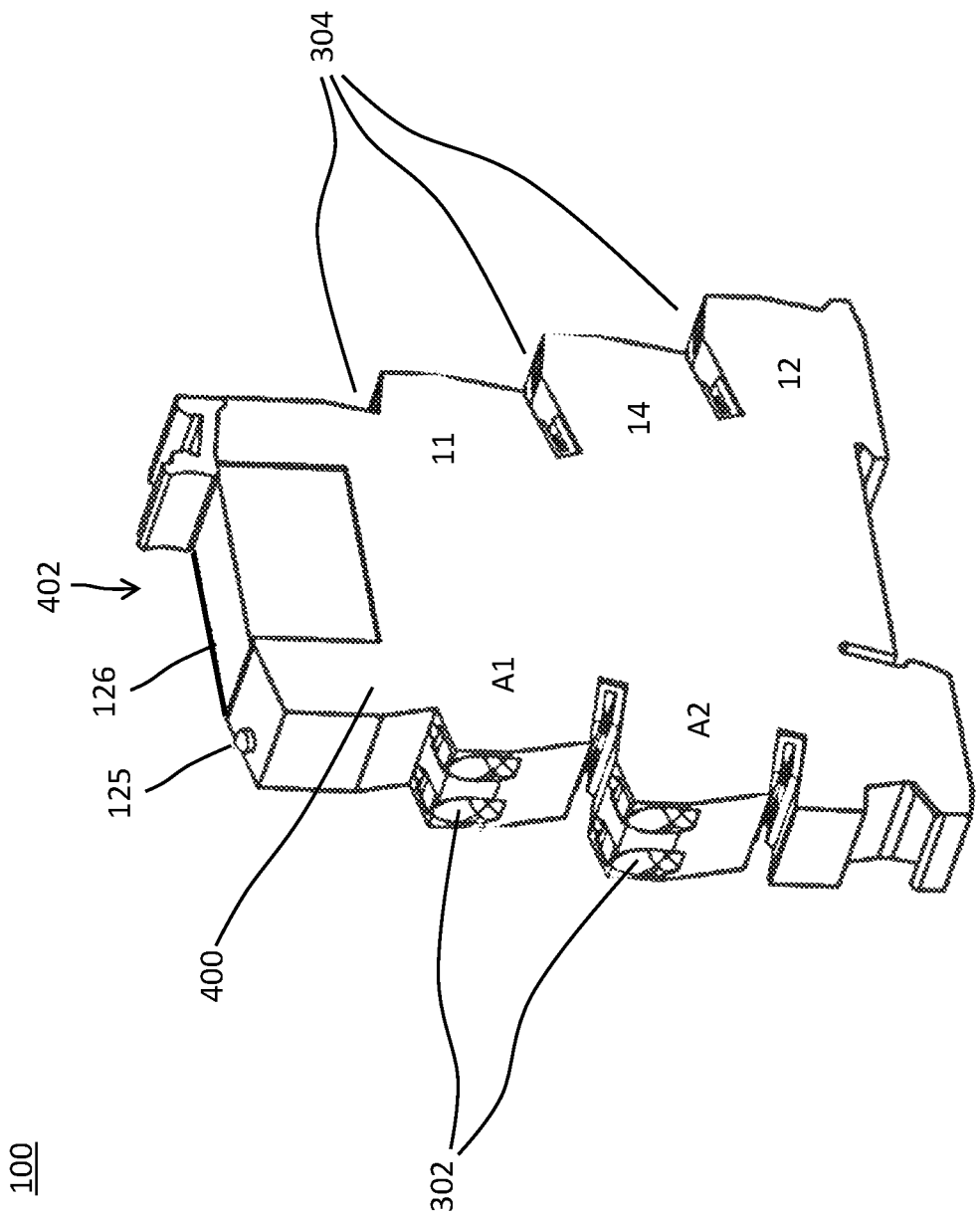
FIG. 4 is a perspective view of a relay module according to a fourth embodiment of the present disclosure.

FIG. 4 shows a perspective view of a relay module according to a fourth embodiment of the present disclosure. The fourth embodiment may be implemented with some or all of the features of the independent claim, the first embodiment, the second embodiment, and/or the third embodiment. Features that are the same as or interchangeable with those of another embodiment are described with the same reference numerals in the fourth embodiment.

Due to the capacitive reactance 108 in the input and the low current consumption of the comparator 120, only very low power losses occur in a closed housing 400. The housing 400 may, for example, be a relay module (for example as shown in FIG. 4), preferably with a width of 14 mm.

Thus, the fourth embodiment may correspond to the existing physical conditions, particularly in the relay module, without an additional external supply voltage (i.e., without additional clamping points, etc.). Each of the embodiments may implement a low-cost, low-consumption, space-saving relay module 100 with a uniform (i.e., low-hysteresis) and/or adjustable switching threshold.

Alternatively or additionally, the housing 400 may include a slot 402 for interchangeably or reversibly receiving the relay unit 126. The relay unit 126 may be flush with the housing in the inserted state. A biased and longitudinally movable slider may secure the relay unit 126 in the slot 402.

LIST OF REFERENCE NUMERALS

Relay module 100
Control input 102
RC filter 104
Input voltage 106
Capacitive reactance 108
Rectifier 110
DC voltage 112
Fixed voltage regulator 114
Fixed voltage 116
Reference voltage 118
Comparator 120
Control voltage 122
Switching stage 124
Status indicator 125
Relay unit 126
Diagram 200
AC voltage at control input 202
Rectified and smoothed portion of AC voltage 204
Control input connections 302
Switching terminals 304
Varistor 306
Bridge rectifier 308
Smoothing capacitor 310
Voltage regulator 312
Self-conducting field-effect transistor 314
Half-wave rectifier 316
Further smoothing capacitor 318
Voltage divider 320
Potentiometer 322
Housing 400
Slot 402

What is claimed is:

1. A relay module, comprising:
a control input configured to receive AC voltage for combined control and power supply of the relay module;
a capacitive reactance arranged between the control input and a first rectifier, which produces a first portion of the AC voltage for rectification;
the first rectifier connected upstream of a fixed voltage regulator for rectifying the first portion of the AC voltage;
the fixed voltage regulator configured to generate a fixed voltage after the rectification of the first portion of the AC voltage;
a comparator with a second rectifier and a smoothing capacitor that are connected to the control input independently of the first rectifier and upstream of the capacitive reactance, the comparator being configured:
  (i) to be driven by the fixed voltage,
  (ii) to generate, using the second rectifier and the smoothing capacitor, a rectified and smoothed second portion of the AC voltage, and
  (iii) to compare said rectified and smoothed second portion with a reference voltage derived from the fixed voltage,
  wherein the comparator is adapted to switch a relay unit (a) between an on state and an off state based on a comparison with an on threshold and an off threshold as the reference voltage derived from the fixed voltage, the off threshold differing by no more than 1% of the on threshold, and (b) with no or equal on and off delay;
the relay unit having an input side and an output side; and
a switching stage configured to operate the relay unit according to the on state and the off state resulting from the comparison of the comparator, wherein the input side of the relay unit is connected to the switching stage, which uniquely determines the on state of the relay unit and the off state of the relay unit, and the output side of the relay unit is connected to switching connections of the relay module.

2. The relay module according to claim 1, wherein the derived reference voltage is a fixed portion of the fixed voltage.

3. The relay module according to claim 2, wherein the first rectifier is connected upstream of the fixed voltage regulator and includes a bridge rectifier for rectifying the AC voltage or a portion of the AC voltage.

4. The relay module according to claim 1, wherein the switching stage switches a coil circuit of the relay unit fed by the first rectifier.

5. The relay module according to claim 4, wherein a status indicator is connected in series with the coil circuit in the relay unit.

6. The relay module according to claim 1, wherein a majority of the AC voltage is dropped at the capacitive reactance.

7. The relay module according to claim 1, wherein more than half of the AC voltage is dropped at the capacitive reactance.

8. The relay module according to claim 1, wherein 75% of the AC voltage is dropped at the capacitive reactance.

9. The relay module according to claim 1, wherein the comparator is configured to generate the rectified and smoothed portion of the AC voltage for comparison with the reference voltage independently of the first rectifier connected upstream of the fixed voltage regulator.

10. The relay module according to claim 1, wherein the comparator includes a half-wave rectifier as the second rectifier with a smoothing capacitor to which a portion of the AC voltage is applied as input voltage and which is configured to generate a smoothed DC voltage for the rectified and smooth portion of the AC voltage in the comparator.

11. The relay module according to claim 10, wherein the comparator includes a voltage divider to which the smoothed DC voltage of the half-wave rectifier is applied and which is configured to generate a portion of the smoothed DC voltage as the rectified and smooth portion of the AC voltage in the comparator.

12. The relay module according to claim 11, wherein the voltage divider is controllable by means of a potentiometer.

13. The relay module according to claim 10, wherein the first rectifier is connected upstream of the fixed voltage regulator and includes a bridge rectifier for rectifying the AC voltage or a portion of the AC voltage, and
wherein the input voltage of the comparator is tapped between the control input and the first rectifier connected upstream of the fixed voltage regulator.

14. The relay module according to claim 10, wherein the first rectifier is connected upstream of the fixed voltage regulator and includes a bridge rectifier for rectifying the AC voltage or a portion of the AC voltage, and
wherein the input voltage of the comparator is tapped between the control input and the first rectifier connected upstream of the capacitive reactance.

15. The relay module according to claim 1, wherein the relay module is arranged in a closed housing.

16. The relay module according to claim 15, wherein externally accessible terminals of the switching connections are arranged on the housing, wherein the housing is configured for mounting on a mounting rail.

17. The relay module according to claim 15, wherein externally accessible terminals of the switching connections are arranged on the housing, wherein the housing is configured for mounting on a top-hat rail.

18. The relay module according to claim 15, wherein the housing has an externally accessible slot for reversible mechanical and electrical connection of the relay unit to the relay module.

19. The relay module according to claim 1, wherein the relay module is arranged in a closed housing free of ventilation openings, and
wherein the relay module operates with low power dissipation.

20. The relay module according to claim 1, wherein the first rectifier includes a bridge rectifier and the second rectifier includes a half-wave rectifier.

21. The relay module according to claim 1, wherein the fixed voltage regulator comprises a voltage regulator preceded by a depletion-mode MOSFET.

* * * * *